(No Model.) 11 Sheets—Sheet 1.

W. GROTH.
POST MARKING AND STAMP CANCELING MACHINE.

No. 419,014. Patented Jan. 7, 1890.

Fig.1.

WITNESSES:

INVENTOR
BY
ATTORNEY.

(No Model.) 11 Sheets—Sheet 6.

W. GROTH.
POST MARKING AND STAMP CANCELING MACHINE.

No. 419,014. Patented Jan. 7, 1890.

Fig.6.

(No Model.) 11 Sheets—Sheet 8.

W. GROTH.
POST MARKING AND STAMP CANCELING MACHINE.

No. 419,014. Patented Jan. 7, 1890.

WITNESSES:

INVENTOR
Wm Groth
BY
W. W. Dudley
ATTORNEY.

(No Model.) 11 Sheets—Sheet 9.

W. GROTH.
POST MARKING AND STAMP CANCELING MACHINE.

No. 419,014. Patented Jan. 7, 1890.

WITNESSES:

INVENTOR
Wm Groth
BY
W. W. Dudley
ATTORNEY.

(No Model.) 11 Sheets—Sheet 10.
W. GROTH.
POST MARKING AND STAMP CANCELING MACHINE.

No. 419,014. Patented Jan. 7, 1890.

WITNESSES:

INVENTOR

BY his ATTORNEY.

(No Model.) 11 Sheets—Sheet 11.
W. GROTH.
POST MARKING AND STAMP CANCELING MACHINE.

No. 419,014. Patented Jan. 7, 1890.

WITNESSES:

INVENTOR

BY

ATTORNEY.

UNITED STATES PATENT OFFICE.

WILLIAM GROTH, OF SEATTLE, WASHINGTON, ASSIGNOR OF ONE-THIRD TO THOMAS S. CONSTANTINE, OF NEW YORK, N. Y.

POSTMARKING AND STAMP-CANCELING MACHINE.

SPECIFICATION forming part of Letters Patent No. 419,014, dated January 7, 1890.

Application filed October 14, 1889. Serial No. 326,906. (No model.)

*To all whom it may concern:*

Be it known that I, WILLIAM GROTH, a citizen of the United States, residing at Seattle, in the county of King and Territory of Washington, have invented certain new and useful Improvements in Postmarking and Stamp-Canceling Machines; and I do hereby declare the following to be a full, clear, and exact description of the invention, such as will enable others skilled in the art to which it appertains to make and use the same.

My invention relates to machines for postmarking letters and canceling the postage-stamps thereon; and my said invention consists of certain novel parts and combinations of parts wherein a pneumatic device operates to take up a letter from a package and to carry it by a free upward circular movement to and deposit it by a vertical drop at the point where it is to receive the dating and canceling impression, as I shall now describe, and particularly point out in the claims concluding this specification.

Referring to the drawings, Fig. 5 is an elevation of the left end of such machine. Fig. 5ª are views of the tappet-shaft crank-pin and its slotted plate-connection for operating the letter-supporting followers. Fig. 5ᵇ is a view of the slotted gear and its lever-connection for alternately operating the pneumatic transferring device.

A suitable frame is provided for containing and supporting the several operating parts of the machine.

At the front of the machine a series of sorting-boxes 1 are arranged for containing the letters in separate and distinct packages, and at the rear of the machine a suitable box 2 is provided with sorting-compartments 3 to receive the letters after having been postmarked and canceled, while between these parts is arranged an endless apron 4, upon which the letters are deposited to be postmarked and the stamps canceled and delivered sorted into the receiving-boxes. These parts are arranged at the top of the frame, the rear boxes being placed below the upper surface of the apron.

The devices for transferring the letters singly from their containing-boxes to the endless apron and for postmarking and canceling the letters deposited thereon are arranged for operation above the frame, and their operating mechanisms are suitably arranged and disposed at each end of the frame, while the power crank-shaft 5 is suitably mounted above the letter-containing boxes. This disposition of the parts gives a desirable compactness to the machine and brings the movements of the operating parts within convenient combinative relation.

Referring to these separate mechanisms, I will now more particularly describe their construction in the organization of the machine.

Along the front side of the machine and between the end frames thereof is secured a frame 6, which is divided into a series of compartments by partitions 7, the tops of which are about on a level with the top of the frame and are supported upon a cross-bar 8, which connects the end frame 9. Each of these compartments is provided with a follower 10, upon which the letters are placed in sorted packages and fed upward. Each follower has a central downwardly-projecting hollow guide-stem 11, which passes through a guide-tube 12, depending from the bottom cross-bar 8. The hollow guide-stem 11 has a vertical slot 13, Fig. 10, on one side, and on the other side it has a series of holes which act as a rack 14.

Figure 10:
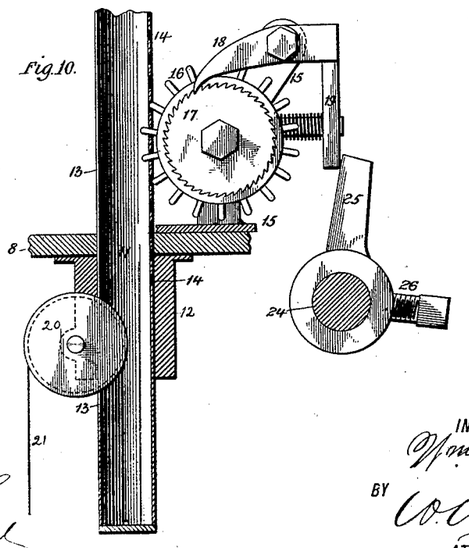
Fig. 10 is a vertical sectional detail view of the ratchet device for feeding the follower and the letters thereon to the suction take-up tubes.
Figure 11:
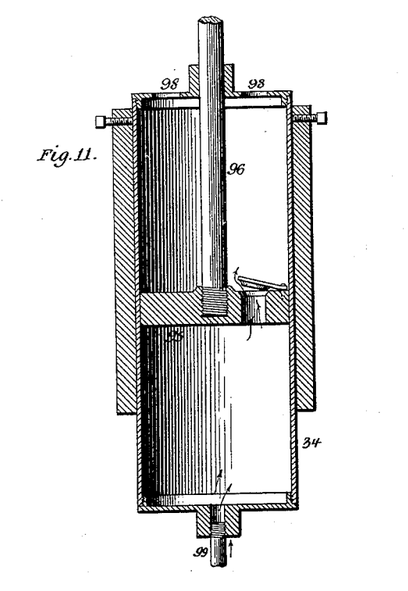
Fig. 11 shows the air-exhausting cylinder in section.

A bracket 15, Fig. 10, secured to the bottom cross-bar 8, stands to the front of the latter, and, rising from the top thereof, has mounted therein on a short stem a toothed wheel 16, adapted to engage the rack 14 of the guide-stem. A ratchet-wheel 17 is fixed to the outer side of this toothed wheel, and both together turn loosely upon the said bracket-stem. A pawl 18 is pivoted to the upper end of the bracket 15, so as to engage the said ratchet-wheel, and has a depending arm 19 at its outer end, the purpose of which I will presently state. A tubular guide 12 for the hollow stem 11 depends from the bottom cross-bar 8, and has mounted in a bracket on the outer side thereof a sheave 20, over which passes a cord 21, which, passing through the vertical slot 13 in the follower guide-stem 11, is connected to the lower end thereof, while its other end has a weight 22, which constantly tends to raise the follower. A guide-yoke 23 for this weight depends from the bottom cross-bar 8 and serves to limit the descent of the weight, and thereby limit the ascent of the follower.

A horizontal rock-shaft 24 is mounted in bearings in the end frames just beneath and to the front of the bottom cross-bar 8, and is provided with a tappet or arm 25, Fig. 10, rising in such relation to the depending arm 19 of the ratchet-pawl 18 as to strike and move it inward and thereby raise and release the pawl from the ratchet-wheel 17, and thus allow the follower 10 to be raised by the weight at the moment the pneumatic suction-tube is at the limit of its downward movement over the package of letters and is about to take up and transfer a letter. In this way the letters of the package are fed up as each top letter is removed from the package.

The tappet or arm 25 is adjusted by a clamp-screw 26 to effect the release of the ratchet 17 at the proper moment in the movement of the transferring device. The provision for operating this rock-shaft I will presently describe in connection with the provision for operating the transferring device, which I will now describe.

Above the top of the frame, in suitable bearings in the end frames and at points just in the rear of the package-containing compartment, are mounted short shafts 27, standing in coincident lines across the frame, having crank-arms 28 standing in the same plane, to the ends of which the cross-bar 29 of the transferring device is pivoted, so as to have a movement in the arc of a circle struck from the axis of said short bearing-shafts. This cross-bar 29 carries the pneumatic suction-tubes 30 on its under side, which must be maintained in vertical positions in every part of the circular sweep of the bar. For this purpose I supplement each crank-arm 28 with a second crank-arm 31, standing in parallel relation thereto and connected to suitable pivot-brackets at each end of the cross-bar 29, but not in coincident cross-lines, one bearing being at the front side and the other at the rear side of said bar 29 and both at the same height above said bar, whereby the latter, with an easy sweeping movement, is held with its suction-tubes in vertical positions, so as to descend vertically to take up the letters, to descend vertically to deposit the letters, and between these two points to hold and carry the letters in perfectly-horizontal positions, so as to avoid their premature release from the suction-tubes. The cross-bar carrying the line of suction-tubes has an interior channel 32, which communicates with all the suction-tubes by vertical passages 33, Fig. 8, and with an air-exhausting cylinder 34 by means of a flexible tube 35, extending from the top of the cross-bar.

Figure 8:
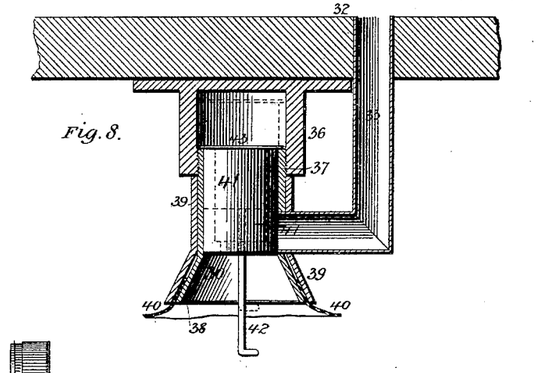
Fig. 8 represents a vertical sectional detail view of one of the suction take-up tubes.

I prefer to construct the suction-tubes as follows: Depending from the under side of the cross-bar is a flanged tubular interiorly-screw-threaded socket 36, Fig. 8, into which is screwed a tubular part 37, terminating in a flaring mouth 38, and having a corresponding shorter sleeve part 39, the upper end of which abuts against the lower end of the upper socket part 36. Between the flaring ends of these two tubular parts is clamped the inner edge part of a rubber ring 40, so that the lower edge of the latter stands out from the clamp and forms a flaring bell-mouthed sucker part, which is brought in contact with and is caused to take hold of the letter at the moment the air is exhausted from the flaring mouth above the surface of the same. For this purpose each sucker-tube is provided with an interior plug-valve 41, the normal position of which closes the exhaust-passage 33, as shown in Fig. 8, so that if there should be no letters in any one of the compartments the sucker-tube 30 corresponding therewith would have its exhaust-passage 33 closed, and thereby not interfere with the action of the other sucker-tubes. Therefore, to render the valve of each sucker-tube active, it is provided with a vertical stem 42, so that in descending upon the package of letters the stem will first strike upon said package and the valve be thus automatically raised to open the exhaust. In this way, while all the sucker-tubes are in communication with the exhaust, each one is rendered independent of the other, and is thereby made operative in the compartments which may contain letters. The provision for clamping the yielding sucker-mouth renders the renewal of the latter easy and convenient, so as to always provide for a perfect seating of a sucker-mouth. The play of the valve is limited by a top plate or cap 43, adapted to rest at its projecting edge upon an interior annular shoulder in the socket part. I prefer to make the exhaust communication of the air-channel in the bar with the flaring sucker-mouth by outside branch tubes, and thereby give a quick exhaust communication.

I will now describe the provisions whereby the letter-transferring device is operated in unison with the means for feeding the letters thereto.

Figures 5, 5A, 5B:
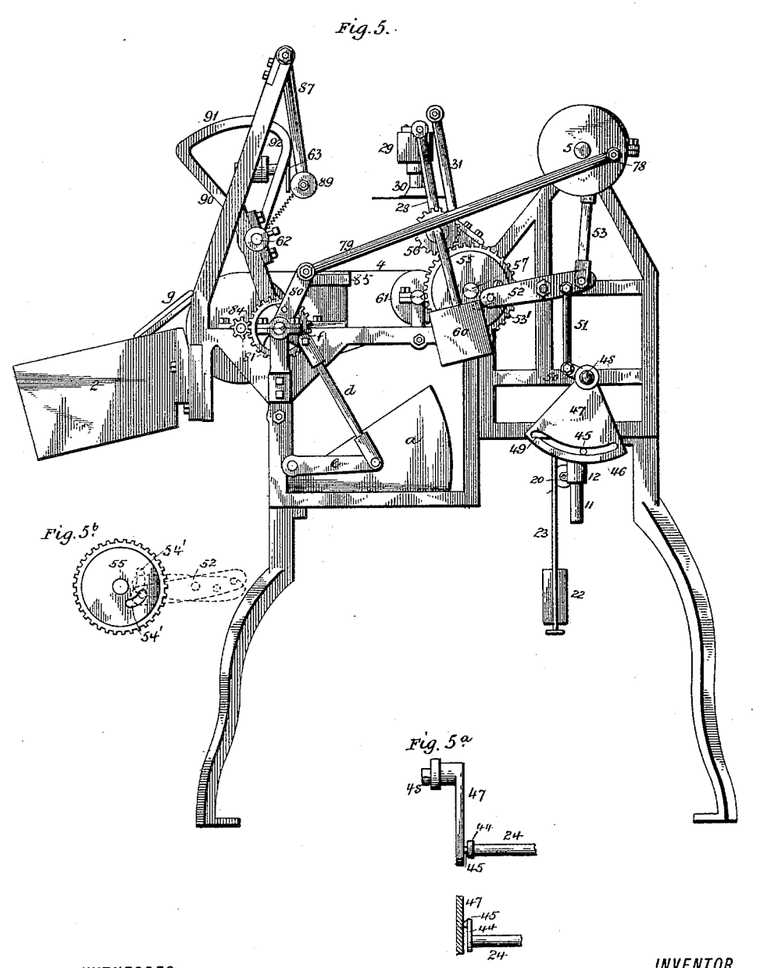

Referring now to the means whereby the packages of letters are fed upward as they are removed one by one, it will be seen, by reference to Figs. 5 and 5ª, that the rock-shaft 24, which operates the letter-supporting followers 10, is provided at its left end with a short crank-arm 44, which stands toward the rear, and has a crank-pin 45, Fig. 5, which extends beyond the outer side of the end frame and engages a slot 46 in a quadrant or plate 47, mounted upon a bearing-bracket 48, projecting from the end frame at a point above the said rock-shaft. This slot 46 is concentric with the axis of the bracket-bearing and terminates in a deflector or oblique end 49 at the rear edge of the quadrant, so that the crank-pin 45 is rendered inactive in the concentric portion 46 of the slot, and is caused to be depressed by the deflected end 49 of said slot, whereby it causes the shaft 24 to be rocked, carrying its tappets or arms 25 inward against the depending arms 19 of the ratchets, and thus release their engagement from the ratchet-wheels and allow the letter-supporting followers to rise at the moment the transferring device is at the limit of its descent to take up the letters. In order that this movement should be in unison with the seizing action of the sucker-tubes, I provide the said slotted quadrant with a short crank-arm 50 on its bearing-sleeve, which arm by a pitman 51 connects with the front end of a lever 52, mounted on a bearing-bracket on the end frame about on a plane with the top thereof. This end of said lever also connects by an eccentric strap-rod 53 with an eccentric 54 on the end of the power-driven shaft 5, which is mounted in suitable bearings in standards of the end frames above the letter-containing compartments, so that the revolution of said shaft vibrates the said lever 52. The rear and longer end of this lever 52 has a pin 53', which engages a segmental slot 54' in the face of a gear-wheel 55 and standing obliquely at one side to the axis of said gear. Engaging with this gear 55 is a pinion 56 on the shaft of the crank-arm 28, which carries the cross-bar 29 of the transferring device. As the lever 52 is vibrated the action of its pin 53' within the segmental slot 54' of the gear causes the latter to move through a determined portion of a revolution alternately with a movement each way sufficient to give a half-revolution of the said crank-pinion 56, and thereby control and determine with precision and exactness the sweep of the transferring device to take up and deposit the letters in position for postmarking and canceling. In this operation the upward movement of the front arm of the lever 52 operates in the said gear-slot 54' to effect the frontward sweep of the transferring device, while the downward movement of the said lever operates in the said gear-slot to reverse the gear and effect the rearward sweeping movement of the transferring device. While the primary object of the obliquely-arranged gear-slot is to effect the backward and forward movement of the transferring device, yet the slot performs the important function of retarding the movement of the transferring device at its taking-up and depositing point, and this is effected by the peculiar form of the slot and its relation to the axis of its gear-shaft, for it will be seen that when the pin 53' is working in that portion of the slot farthest from the axis of its gear the motion of said gear will be slowest, and this retarded motion is at this point communicated to the pinion 56 of the transferring device, and hence the movement of the latter is controlled, as stated.

To give a regular and easy sweeping movement to the transferring device, it is provided alike at each end with the parallel crank-connected arms, while the slotted gear-wheel is mounted upon the end of a rock-shaft 57, supported in suitable bearings in the ends of the frame, and has at its other end a cog-wheel 58, equal in diameter to the slotted gear, which engages a pinion 59, mounted upon the outer end of the short shaft 27 of the crank-arm 28, which carries that end of the transferring device.

To avoid the torsional strain on the short crank-shafts due to the operation of lifting the transferring device, I provide the outer end of the shafts of the crank-arms of such device with counter-weights 60, placed radially in the line of the said crank-arms and standing in opposite directions thereto.

Figure 9:
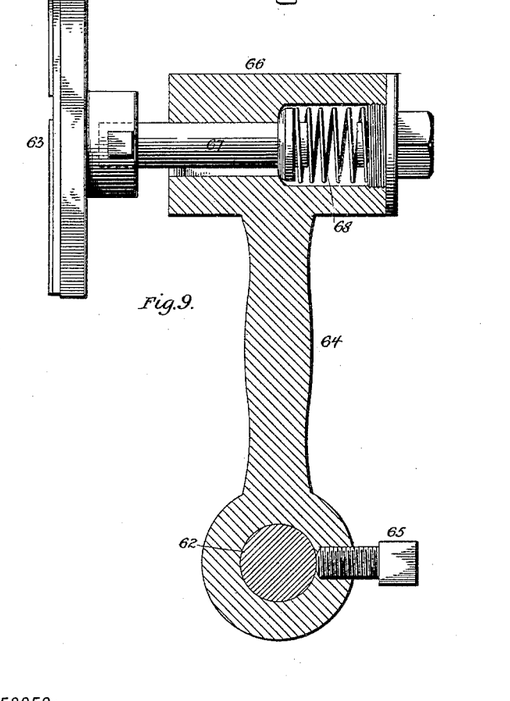
Fig. 9 is a sectional detail view of the impressing-stamp.

Immediately between the compartments into which the letters to be postmarked and canceled are placed and the compartment-box to receive such letters when so canceled and postmarked is arranged the endless apron 4 upon rolls 61, mounted in bearings in the end frames with its upper side in a horizontal plane. At a point above the rear apron-carrying roll is mounted a cross-shaft 62 in suitable bearings in standards of the end frames, and which carries the postmarking and canceling stamps 63, placed at distances along its length corresponding to the position of the letter-containing compartments. These stamps are mounted upon the outer end of arms 64, which operate with a circular sweep toward the front of the machine, while at their shaft-connecting sleeved ends they are provided with screws 65, Fig. 9, by which they are adjustably mounted on the said shaft, whereby their lateral location, as well as the plane of their working-faces, may be regulated in relation to the apron. Each of said stamp-carrying arms has a socket 66 at its outer end, standing at right angles, which socket receives a pin 67, to the outer end of which the stamp is properly clamped by a collar and screw. The inner end of the stamp-carrying pin has a head which limits its outward projection, and upon which an interior spring 68 bears to allow the stamp to slightly yield under its stamping action. This gives the stamp the advantage of adapting itself to letters of different thickness.

I will now describe the provisions by which these stamps are operated in unison with the operation of the transferring device and the endless apron.

Figure 13:
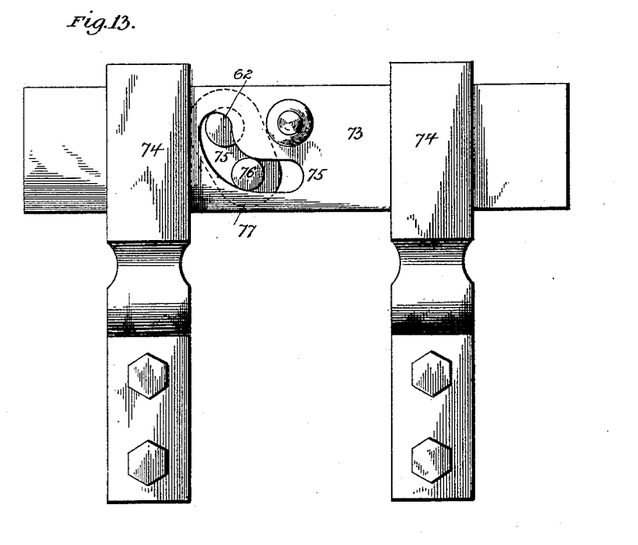
Fig. 13 is a side view of the slotted slide and its crank-pin connection for operating the stamp-carrying shaft.

Referring to the means for operating the stamps, the right end of the power-driven shaft 5 is provided with a gear-wheel 69, which engages with an equal gear-wheel 70, mounted in a bearing in the side frame in the rear of said shaft, and which latter gear carries a crank-pin 71, from which extends a rod 72, whose other end connects with and operates a horizontal slide-bar 73, Fig. 13, mounted in guides 74 at the rear end of said frame and in line with the stamp-carrying shaft. This slide has an angular or L-shaped slot 75, into which travels the pin 76 of a crank-arm 77, secured on the end of the stamp-carrying shaft at the inner side of said slotted plate. The action of this crank-pin and slot is as follows: As the slide 73 is caused to move frontward the horizontal portion of its slot moves over the said crank-pin without giving action to the stamp-carrying shaft, the stamps at this time being held with their arms in nearly vertical position; but the moment the pin enters the upward standing part of the slot the crank-pin is raised, and with it its crank-arm 77, which rocks the shaft 62 and causes the stamps to move forward and downward and impress the letters, so as to effect their postmarking and cancellation, while the endless apron is without motion. It will be understood that in this position of the stamps and at this instant the transferring device is in position to seize and take up the letters and is caused to sweep over and deposit the letters about coincident with the time of the reverse movement of said slotted slide, which causes the return rotation of said shaft, which brings the stamps again to their normal position out of the way of the transferring device.

Figure 12:
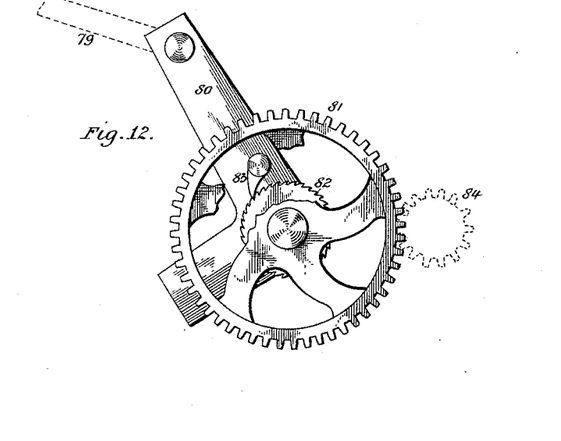
Fig. 12 is a detail view of the ratchet device for feeding the endless apron.

The provisions for operating the endless belt are arranged at the left side of the frame, and consist of a crank-pin 78, mounted on the end of the power-driven shaft 5, from which a rod 79 extends and connects with a crank-arm 80, loosely mounted upon a bearing-stud supported in a bracket, and upon the inner end of said stud-pin is loosely mounted a gear-wheel 81, which carries in fixed relation thereto a ratchet-wheel 82, Fig. 12, into which a pawl 83, carried by the crank-arm 80, engages. This loosely-mounted gear engages with a pinion 84 on the shaft of the rear apron-carrying roll, whereby, by the backward movement of the crank, the ratchet-pawl is caused to ride over the ratchet-wheel without turning the latter; but as the said crank-arm is moved forward by the revolution of the power-driven shaft it turns the ratchet-wheel, and by its connected gear operates the apron-feeding roll, so as to carry the letters which have received the action of the stamps and deliver them into the receiving-compartments in the arrangement in which they were placed in the feeding-compartments. It will be understood that at the moment of depositing and the moment of impressing the letters the endless apron is without movement, and that it has a suitable bed-support 85, provided with a yielding cushion in the line of the action of the stamps.

As a means for inking the stamps, I provide an inking-roll 86, suspended from bearings in the standard of the stamp-carrying shaft by arms 87, having their points of suspension above and slightly in advance of the said shaft, so as to maintain the inking-roll in a line on a plane with the lower ends of the stamps when the latter are in their normal position. The object of this arrangement is threefold—that is to say, to cause the inking-roll to pass over the stamping-surfaces in their downward movement, to automatically press the inking-roll toward the front in such stamp-inking contact, and to obtain a second stamp-inking contact on the upward movement of said stamps. The roll is mounted so as to revolve freely in bearings in the lower ends of its suspending-arms, and is caused by its weight to constantly tend to swing toward the stamps, and I may supplement this action by means of suitable springs 88, which connect each end of said roll with the stamp-carrying shaft. Each end of the inking-roll is provided with a wheel 89, and each end of the stamp-carrying shaft is provided with a quadrant 90, placed in coincident line with the said wheels and formed with a segmental portion 91 and with an inwardly-curved or cam portion 92. The function of the cam portions of said quadrants is, as they move forward, to come in contact with the wheels 89, and thereby continue the forward movement of the inking-roll, so as to place and hold it out of the way of further movements of the inking-stamps.

Figure 14:
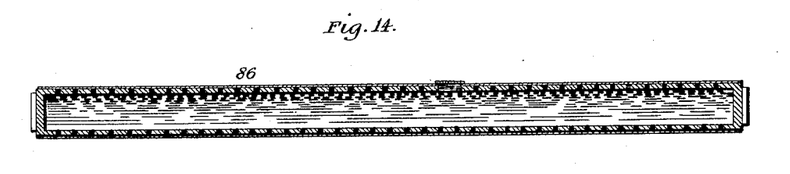
Fig. 14 is a longitudinal sectional view of the inking-roll.
Figure 15:
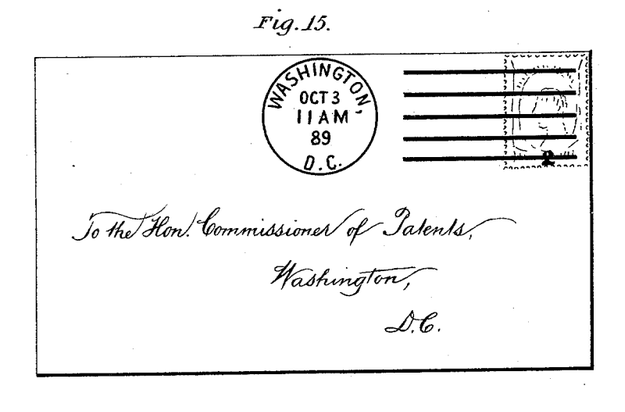
Fig. 15 shows a letter having been postmarked and stamp-canceled by my machine.

Any suitable construction of inking-roll may be employed; but I prefer to make it hollow, with suitable surface-holes which are covered with the ink-supplying pads, and which are fed through said holes. The said roll is provided with a suitable inlet for the ink, as seen in Fig. 14.

Figure 1:
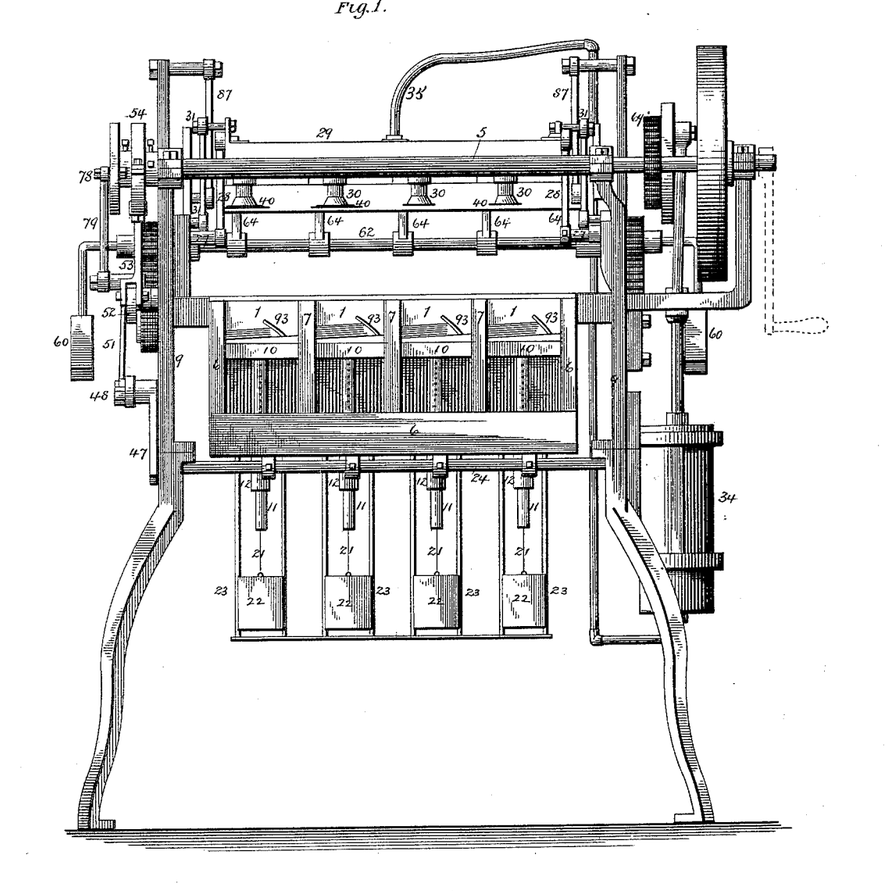
Figure 1 represents a front elevation of a machine for postmarking and canceling letters embracing my invention.
Figure 2:
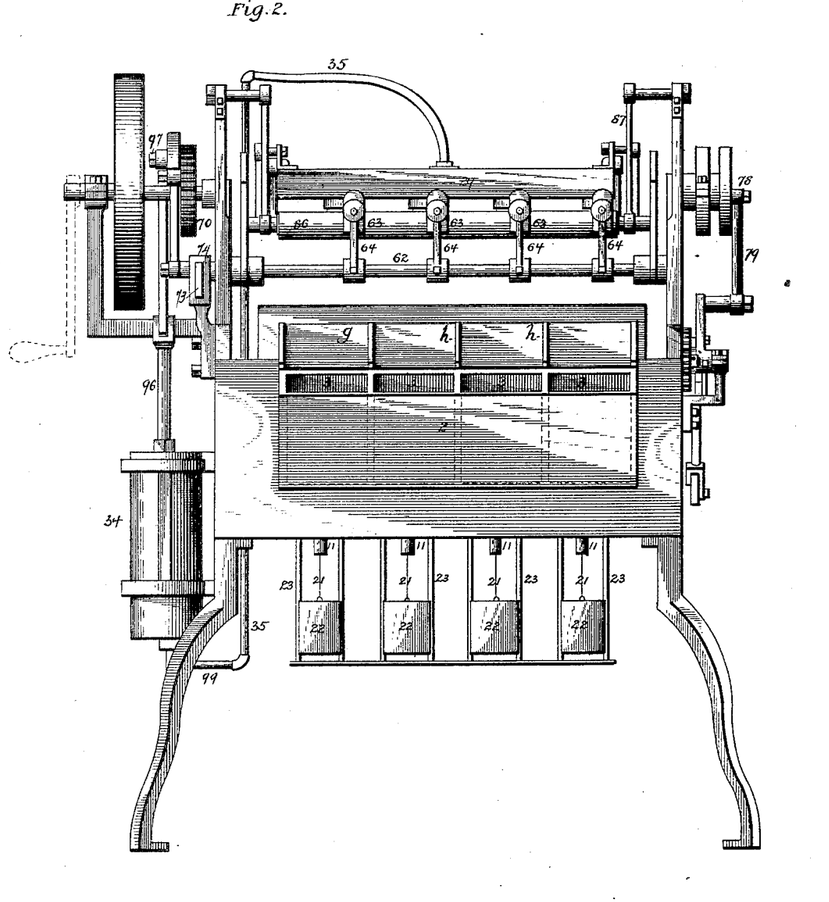
Fig. 2 is a rear elevation of such machine.
Figure 3:
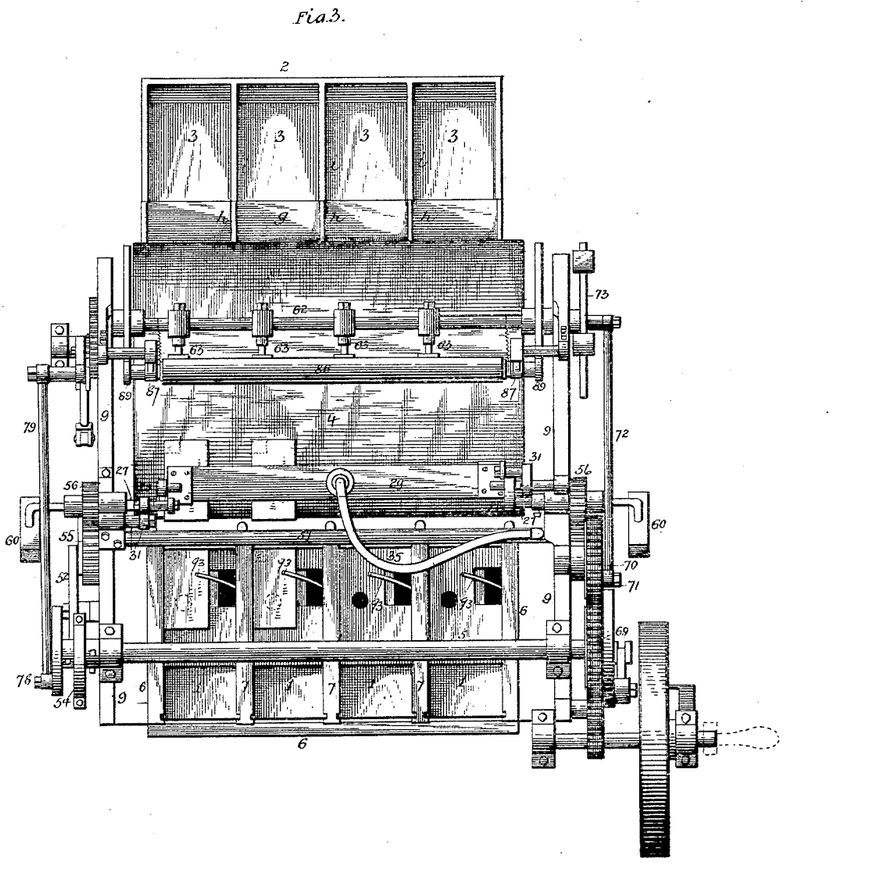
Fig. 3 is a top plan view of such machine.
Figure 4:
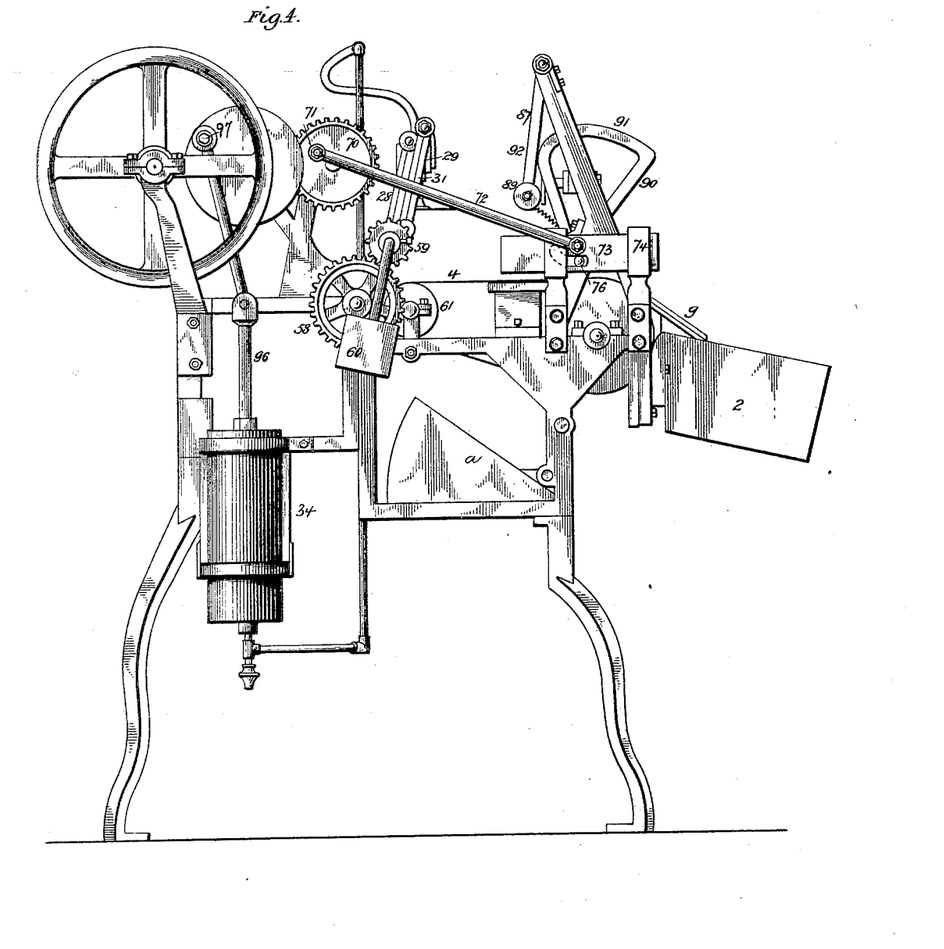
Fig. 4 is an elevation of the right end thereof.

Referring to the letter-receiving compartments, I prefer to make the upper surface of their followers inclined—say toward the left side—as seen in Fig. 1, the better to aid in keeping the letters in one corner of said compartment.

In practice it has been found that the raising of the upper letter by a free upward vertical movement may cause the letter directly beneath to be moved out of alignment with its pile, and as it is important that the sucker-tube should seize each letter at the same point upon its surface in order to bring the postmarking and stamp-canceling impression upon the proper corner, which will not be the case if each letter is not in the same relative position to receive the suction-tube, I employ a rubber finger 93, which is attached to the side wall of the compartment opposite to that against which the letters are placed, and at such point as to cause its upper portion to rest against the side edge of the uppermost letter, and thus restore each letter to its exact position in the opposite corner of the compartment. This finger is of smooth round form and offers no resistance to the upward movement of the letters as they are carried up by the sucker-tube.

Figure 6:
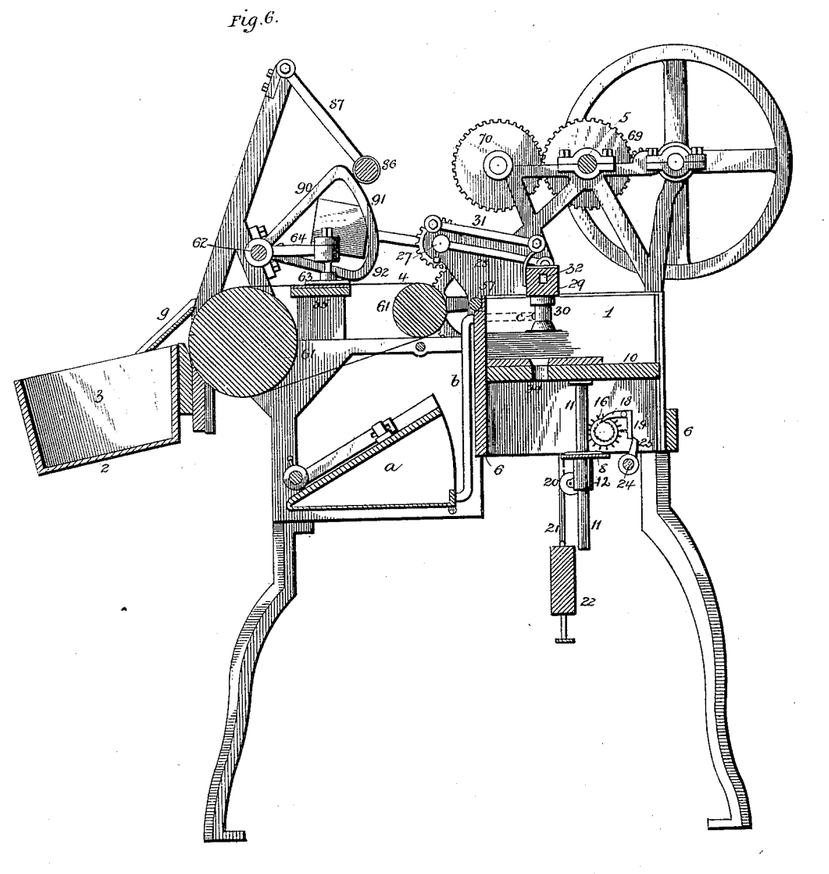
Fig. 6 represents a vertical longitudinal section of the machine, showing the pneumatic transferring device in the position it occupies at the moment of taking up a letter and the stamping device in position to impress a letter.
Figure 7:
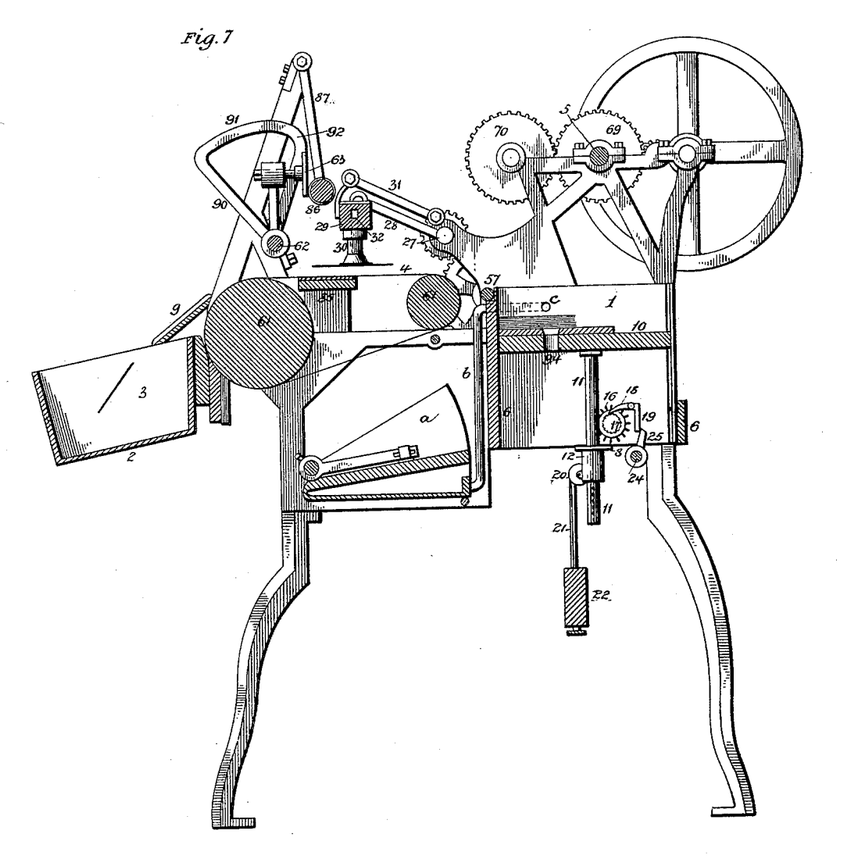
Fig. 7 is a vertical longitudinal section of the machine, showing the pneumatic transferring device in the position it occupies at the moment of dropping the letter to receive the impression of the stamp.

To provide for the separate and independent action of the suction-tubes in the absence of letters in any one of the compartments, I provide the follower with a hole 94, Figs. 6 and 7, to receive the stem 42 of the valve 41 of the sucker-tube, and thereby prevent the opening of such valve, which would otherwise destroy the exhaustive action of the transferring device. I prefer to arrange the air-exhausting cylinder on the right side of the frame and to operate its piston 95 by a pitman-rod 96, connected to a crank-pin 97 of the power-driven shaft. The upper end of the cylinder is provided with holes 98, and from its lower end extends a pipe 99, which suitably connects with the channel 32 of the cross-bar of the transferring device. The crank-pin of the piston-rod is so arranged relative to the movement of the transferring device that the upward movement of the piston will commence just before the upward movement of the transferring device commences for the purpose of rendering effective the take-up action of the sucker-tubes, and that the piston will continue to rise during the entire backward sweep of the transferring device. At the limit of this movement the piston instantly reverses and its valve is thereby opened, thus breaking the exhaust and causing the letters to be released from the suction-tubes and dropped upon the apron, the said valve being for this purpose arranged to open upward into the open end of the cylinder. Should it happen that two or more letters may from any cause adhere in the take-up action of the suction-tubes, I provide for the separation of the under adhering letter or letters by means of an air-jet projected laterally across the path of the rising letter. This air-jet is supplied by a suitable bellows $a$, preferably arranged under the endless apron and connected by suitable tubes $b$ with passages $c$, Fig. 7, in the walls of the letter-receiving-compartment partitions, and I prefer to operate this bellows by a pitman-rod $d$, connecting a crank-arm $e$ of the moving part of the bellows with a crank-arm $f$ of the apron-feeding device. (See Fig. 5.) The action of this air-jet is so timed that it will only be expelled coincident with the moment when the edges of the adhering letters shall come opposite the inlet-hole $c$ in the letter-receiving-compartment partition, thus obviating all danger of the blast passing over the top of the letter and breaking the grasp of the suction-tube thereon.

It is obvious that the stamps may be varied as may be desired, and that while one or more of the series are canceling the postage-stamps of and postmarking the outgoing mail the others of the series may be postmarking the incoming mail.

The compartments for receiving the stamped letters are connected with the surface of the endless belt by an inclined chute-board $g$, having surface strips or divisions $h$, corresponding with the partitions $i$ of the compartments.

The machine may be operated by hand or other power, and it will be understood that a suitable balance-wheel may be employed.

The end wheels of the inking-roll may turn loose upon their bearings; but I prefer to fix them upon their bearings, so as to obtain the advantage of causing the roll to revolve by the action of the quadrant-plates of the stamp-carrying shaft, and thereby constantly present a fresh inking-surface of the roll to the stamps.

I have shown and described a bellows for supplying the lateral air-jets to separate adhering letters; but it is obvious that a blower will answer as well.

The letters being placed in packages in the front compartments, the power-driven shaft is put in motion, which operates the transferring device and causes the pneumatic tubes thereof to press upon the letters and seize and hold them by suction, then, rising, carry the letters upward and rearward in a position to release and deposit them upon the endless apron. At this point the pneumatic device is caused to stand still for a moment, and the canceling and postmarking device is moved forward and downward to bring the stamps upon the letters resting upon the apron. Simultaneously with this forward movement of the stamping device the transferring device returns to again seize and take up letters from the packages, and while so doing the stamping device rises rearward out of the way of the transferring movement of the pneumatic device, which again deposits the letters upon the apron. As the stamping device rises it presents the faces of the stamps frontward to receive the action of the inking-roll, which is caused to have a downward motion sufficient to pass over the faces of the stamps. At this moment the inking-roll stands between the pneumatic device and the stamp, and as these devices again move forward simultaneously the stamps press against and move the inking-roller frontward, and thereby cause the stamps to be inked by the two movements frontward and rearward of the inking-roll every time the stamps are caused to act upon the letters. In the position of the stamps when in contact with the letters the inking-roll is supported upon the quadrant-cams operated by the shaft upon which the stamps are mounted, and it will be understood that the weight of the roll in connection with its pendent relation to the stamps constantly tends to bring and hold the roll against the faces of the stamps when the latter are presented for that purpose.

In the described movement of the inking-roll it is important to notice that just as it is leaving the faces of the stamps the quadrant-arms, by means of their cam parts, act upon rolls at each end of the inking-roll, and thus push the latter upward a sufficient distance to carry it free of the stamps, while the segmental parts of these quadrants hold the roll in such position. While the letters are being stamped the apron is without movement; but the moment the letters are impressed the stamps rise and the endless apron moves to deliver them into the compartments provided to receive them, and at the moment of such delivery the movement of the apron ceases and remains still to receive the next letters deposited from the pneumatic device. In this operation the letters are delivered in the same assortment as that in which they are made in the first instance, and this advantage is obtained by the organization of the machine, which causes the stamped letters to be delivered by the apron into separate and distinct compartments in lines longitudinally coincident with the impressing and the front sorting compartments. The importance of this advantage is seen in the saving of the time and labor to effect a reassortment of the letters after being stamped.

As the pneumatic transferring device consists of a series of suction-tubes which correspond in positions to the location of the letters in the front compartments, and as all these compartments may not be supplied with letters, I provide each sucker-tube with an independent valve, whereby to cut off the action of the exhaust in any one of these tubes which may for the time act in a compartment that has no letters in it, and thereby provide for the independent action of all the sucker-tubes, so that whether they all act or not the exhaust will be maintained in those which do act upon the letters by causing each valve to be opened by coming in contact with the letters.

Another important advantage of my invention is the provision of an air-jet projected across the path of the letters as it is raised from the stack as a means of effecting separation in case two or more letters should from any cause stick or adhere together on being lifted by the suction-tube.

As my invention in the before-described machine, I claim—

1. In a machine for postmarking letters and canceling the postage-stamps thereon, the combination of an intermittently-operating endless apron, a series of compartments for containing the letters arranged across the front end of said apron, an intermittently-operating pneumatic letter-transferring device arranged above said apron, and a stamping and canceling device having its impressing-stamps registering with said compartments, substantially as described, for the purpose specified.

2. In a machine for postmarking letters and canceling the postage-stamps thereon, the combination of an intermittently-operating endless apron, a series of compartments for containing letters arranged across the front end of said apron, an intermittently-operating pneumatic letter-transferring device, a stamping and canceling device having its impressing-stamps registering with said compartments, and a series of letter-receiving compartments arranged at the delivery end of said apron to register with and correspond to the letter-containing compartments and to the said stamps, substantially as described, for the purpose specified.

3. In combination, in a machine for postmarking letters and canceling the postage-stamps thereon, an intermittently-operative letter-carrying apron, a series of front compartments for containing letters, and an intermittently-operated pneumatic letter-transferring device, with an intermittently-operated rock-shaft having a series of radially-projecting arms provided with impressing-stamps at their outer ends arranged to register with the said letter-containing compartments, substantially as described.

4. In a machine for postmarking letters and canceling the postage-stamps thereon, the combination of the intermittently-operated letter-carrying apron, a series of front compartments for containing letters, and an intermittently-operated pneumatic letter-transferring device, with an intermittently-operated rock-shaft, a series of radially-projecting arms upon said shaft having impressing-stamps secured to their outer ends, and an inking-roller suspended above said apron to bear against the faces of said stamps when the latter are in their raised positions, substantially as described.

5. The combination, in a machine for postmarking letters and canceling the postage-stamps thereon, of the intermittently-operated letter-carrying apron, a series of front compartments for containing letters, and an intermittently-operated pneumatic letter-transferring device, with an intermittently-operated rock-shaft provided with radially-projecting arms having impressing-stamps secured to their outer ends, quadrants upon the ends of said rock-shaft having segmental portions and cam portions, and an inking-roller suspended by arms at its ends and having rollers in the planes of said quadrants, substantially as described, for the purpose specified.

6. The combination, in a machine for postmarking letters and canceling the postage-stamps thereon, of an intermittently-operated letter-carrying apron, a series of letter-containing compartments arranged transversely at the front end of said apron, a series of letter-receiving compartments arranged transversely at the delivery end of said apron, an intermittently-operated oscillating transfer-bar arranged above the said apron and provided with a series of suction-tubes which correspond to and register with said front and rear compartments, an intermittently-operated rock-shaft above the delivery end of said apron, and a series of radially-projecting arms having impressing-stamps and adjustably secured to said shaft, substantially as described.

7. In a machine for postmarking letters and canceling the postage-stamps thereon, the combination, with an endless letter-carrying apron and a series of letter-containing compartments at the front end of said apron, of two intermittently-operated short rock-shafts 27, journaled above the apron and in the same crosswise axial line, two arms 28, secured to the inner ends of said rock-shafts, a cross-bar 29, pivotally supported at its ends between the ends of said arms 28 and provided with suction-tubes 30 upon its under side, and two arms 31, pivoted at their inner ends, respectively, at points forward and rearward of said rock-shafts 27 and to the diagonally-opposite corners of said cross-bar 29, substantially as described, whereby the suction-tubes of said cross-bar are caused to maintain vertical positions in every part of the sweeping movement of said bar.

8. In a machine for postmarking letters and canceling the postage-stamps thereon, the combination, with an endless letter-carrying apron and a series of letter-containing compartments at the front end of the same, of a power or drive shaft 5, provided with an eccentric 54, an eccentric strap-rod 53, a lever 52, having one arm pivotally connected to said rod 53 and having a laterally-projecting stud 53' upon its other arm, a rock-shaft 57, journaled parallel to said power-shaft, and at the front end of said apron gear-wheels 55 upon the ends of said shaft, one of which wheels is formed with an oblique segmental slot 54 in its face for the engagement of the stud 53' upon the lever 52, short rock-shafts 27, journaled above said apron and in the same crosswise axial line, pinions 56 upon said shafts and meshing with said gear-wheels 55, two arms 28, secured to the inner ends of said rock-shafts, a cross-bar 29, pivotally supported at its ends between the ends of said arms and provided with suction-tubes upon its under side, and two arms 31, pivoted at their inner ends, respectively, at points forward and rearward of said rock-shafts and to the diagonally-opposite corners of said cross-bar, substantially as described.

9. In a machine for postmarking letters and canceling the postage-stamps thereon, the combination, with an intermittently-operating letter-carrying apron, of a rock-shaft 62, journaled above said apron and provided with a series of radially-projecting arms 64, having impressing-stamps 63, and with a crank 77 at one end, a reciprocating slide 73, having a slot 75 formed of a horizontal and an upward and oblique portion for engagement with the pin 76 of said crank, a revolving power-shaft 5, a gear-wheel 70, connected to be revolved by said shaft, and a connecting-rod 72, pivoted at one end to a crank-pin 71 upon said gear-wheel and at the other end to said slide, substantially as described, whereby the said impressing-stamps are oscillated in unison with the feed of the apron.

10. In a machine for postmarking letters and canceling the postage-stamps thereon, the combination, with an endless letter-carrying apron having the shaft of one of its rollers provided with a pinion 84, a gear-wheel 81, engaging said pinion, a ratchet-wheel 82, secured to the face of said gear-wheel 81, an arm 80, fulcrumed concentric to said gear and ratchet wheels and provided with a pawl 83, engaging the teeth of the latter, a power-shaft 5, having a crank-pin 78, and a connecting-rod 79, pivotally connected at its ends to said arm 80 and to said crank-pin 78, of a rock-shaft 62, having a series of radially-projecting arms 64, provided with impressing-stamps, and means, substantially such as described, for intermittently rocking said shaft, substantially as described.

11. In a machine for postmarking letters and canceling the postage-stamps thereon, the combination of a power or drive shaft having a crank-pin 78 upon one end and a gear-wheel 69 at the other end, an endless letter-carrying apron, a pinion 84 upon the shaft of one of the rollers of the same, a gear-wheel 81, engaging said pinion, a ratchet-wheel 82, secured to the face of said gear-wheel 81, and arm 80, fulcrumed concentric to said gear and ratchet wheels and provided with a pawl 83, engaging the teeth of the latter, a connecting-rod 79, pivoted to said arm and to the crank-pin of the power-shaft, a rock-shaft 62, journaled above said apron and provided with radial projecting arms 64, having impressing-stamps, and with a crank 77 at one end, a reciprocating slide 73, having a slot 75, formed with a horizontal and an upwardly-inclined portion for engaging the pin of said crank, a gear-wheel 70, engaging with the gear-wheel 69 upon the power-shaft, and a connecting-rod 72, pivoted at one end to a crank-pin 71 upon said gear-wheel and at the other end to said slide, substantially as described.

12. In a pneumatic letter-transferring device for machines for postmarking letters and canceling the postage-stamps thereon, the combination, with an internally-screw-threaded socket 36 and inner tube 30, having an externally-threaded upper end fitting in said threaded sockets and a flaring or bell mouth and a correspondingly-shaped sleeve 39, of a rubber ring 40, having its inner edge clamped between the bell-mouths of said sleeve and tube and having its outer edge projecting beyond the flaring mouths of the same, substantially as described.

13. In a pneumatic letter-transferring device for machines for postmarking letters and canceling the postage-stamps thereof, the combination of a bell mouthed suction-tube having a flaring rubber ring at the edge of its mouth, an air-exhaust pipe 33, opening through the side of said tube, and a valve 41, sliding within said tube to cover and uncover the opening of said pipe and provided with a stem 42, which projects below the mouth of said suction-tube when the valve is closed, substantially as described.

14. In a pneumatic letter-transferring device for machines for postmarking and canceling the postage-stamps of said letters, the combination of a bell-mouthed suction-tube having an air-exhaust opening 33 and a valve 41, controlling said air-exhaust opening, and having a stem 42 depending below the mouth of said suction-tube when the valve is closed, substantially as described.

15. In a machine for postmarking letters and canceling the postage-stamps thereon, the combination, with a compartment for containing the letters, provided with a yielding follower-bottom 10, having a hole 94 therein, of an alternately-operated letter-transferring device provided with a bell-mouth suction-tube having an air-exhaust and a valve which controls said air-exhaust and has a stem 42 projecting below the bell-mouth of said tube and registering with the hole in said follower, substantially as described.

16. In a machine for postmarking letters and canceling the postage-stamps thereon, the combination, with a series of letter-containing compartments provided with yielding follower-bottoms having each a hole 94 therein, of an alternately-operated swinging letter-transferring device consisting of a cross-bar 29, formed with an air-exhaust channel 32, a series of bell-mouth suction-tubes upon the under side of said cross-bar and provided with air-exhaust openings 33, communicating with said channel, and valves 41, which control said exhaust-openings and have stems 42 projecting below the mouths of said suction-tubes and registering with the holes in the follower-bottoms, substantially as described.

17. In a machine for postmarking letters and canceling the postage-stamps thereon, the combination, with an intermittently-operated swinging letter-transferring device having a suction-tube, of a letter-containing apartment formed with an air-inlet $c$ in its side wall, a follower-bottom 10 for said compartment, a suitable blower $a$, connected to said air-inlet, and means, substantially as described, whereby a blast of air is caused to be expelled as the edge of the letter comes opposite the air-inlet as it is carried upward by the transferring device, whereby any adhering letter is separated therefrom, substantially as described.

18. In a machine for postmarking letters and canceling the postage-stamps thereon, the combination, with an intermittently-swinging letter-transferring device having a suction-tube, of a letter-containing compartment, an inclined yielding follower-bottom therefor, and a smooth rubber finger 93, projecting from the side wall of said compartment above said follower in position to bear automatically and laterally against the edge of the uppermost letter, whereby each letter is kept in position to receive the suction-tube at the same relative point upon its face, substantially as and for the purpose specified.

19. In a machine for postmarking letters and canceling the postage-stamps thereon, the combination of an endless intermittently-operated letter-carrying apron, an alternately-operated pneumatic device for handling the letters in the way described, and an intermittently-operated stamping device, with means for operating the said letter-handling device, consisting of the crank-arms 28, the pinions 56 thereon, the gear-wheels 55, engaging said pinions, having the oblique face-slot 54', the lever 52, engaging said slot, and suitable connections for vibrating said lever, substantially as described.

20. In a postmarking and canceling machine for letters, the combination, with a compartment for containing the letters and a pneumatic device for transferring them therefrom, of a follower-bottom for said compartment, having a stem 11, provided with a rack 14, a gear-wheel 16, engaging said rack, a ratchet-wheel 17 upon said gear, a pawl 18, a rock-shaft 24, having a tappet 25 and mounted in bearings below the follower, and means, substantially such as described, for operating said tappet-shaft, and a cord and weight for operating said follower, for the purpose stated.

21. In a postmarking and canceling machine for letters, the combination, with a compartment for containing letters and a pneumatic device for taking them therefrom, of a follower-bottom having a stem 11, provided with a rack 14 and a cord and weight for raising said follower, a gear-wheel 16, engaging said rack, a ratchet-stop device for the gear-wheel, a shaft 24, having a tappet 25 and a crank-pin 45, a plate 47, having a segmental slot 46, formed with an oblique or deflected end 49, engaging said crank-pin, and suitable connections with the power-driven shaft for vibrating said slotted plate, substantially as described.

22. The combination, in a machine for postmarking letters and canceling the postage-stamps thereon, of a compartment for containing letters and a pneumatic device for taking them therefrom, with a follower-bottom for said compartment, a ratchet-and-weight device for holding and raising said follower, a rock-shaft 24, having a tappet 25 and a crank-pin 45, means for operating said rock-shaft, consisting of the slotted plate 47, having a crank 48, the lever 52, the eccentric 54, and the rods 51 and 53, for connecting these parts, and means for operating the pneumatic device, consisting of the slotted gear 55, engaging said lever 52, the crank-arms 28, carrying said pneumatic device, and suitable means for operating the eccentric, substantially as described.

23. The combination, in a machine for postmarking letters and canceling the postage-stamps thereon, of a compartment for containing the letters, a follower-bottom for said compartment, and suitable means for supporting said follower, with a suction-tube having a valve provided with a depending stem, whereby the said valve is opened to render the suction effective by contact with the letter, substantially as described.

In testimony whereof I affix my signature in presence of two witnesses.

WM. GROTH.

Witnesses:
F. L. BROWNE,
LAMECH DUVALL.